United States Patent Office 3,376,347
Patented Apr. 2, 1968

3,376,347
MONO- AND DI-C-HALOGENATED META- AND PARACARBORANE
Marvin M. Fein, Westfield, and Murray S. Cohen, Morristown, N.J., assignors to Thiokol Chemical Corporation, Bristol, Pa., a corporation of Delaware
No Drawing. Filed Dec. 2, 1964, Ser. No. 415,489
30 Claims. (Cl. 260—606.5)

ABSTRACT OF THE DISCLOSURE

Halogenated carborane compositions, in particular the meta- and paraisomers thereof and processes for their preparation. The compositions are useful as organic intermediates in general, and in particular as a reactant with other compositions to form thermally stable, acid and alkali resistant polymeric materials.

This invention concerns halogenated boron containing compositions and to a process for preparing them.

More particularly, this invention relates to the preparation of halogenated neocarboranes, and to halogenated paracarboranes, in which the boron atoms of the nucleus are free from substitution. These novel compositions are valuable as thermally stable materials and as intermediates particularly in the preparation of thermally stable alkali resistant polymers.

Carborane as defined herein is the generic name given to the diradical of the $(C_2H_{10}B_{10})$ dicarbaclovododecaborane whose empirical formula is $C_2H_{12}B_{10}$, wherein the boron atoms are always free from further substitution.

The diradical of the paraisomer of carborane is referred to herein as paracarboranyl and is symbolized as ⊕.

The diradical of the meta isomer of carborane is referred to as neocarboranyl, symbolized as ⊕.

The diradical of the ortho isomer of carborane is referred to herein as carboranyl and is symbolized as θ.

The mono and dihalogenated meta- and paracarborane products of this invention are useful as organic intermediates generally, and in particular, can be reacted with other compositions to form polymeric materials. For instance, these halogenated products can be condensed with quinones under basic conditions to give useful polymers.

The ortho carboranes and their derivatives are especially interesting compounds with a combination of unusual properties. For example, they are relatively thermally stable compositions and are comparatively inert to chemical attack, particularly to attack in an acidic environment.

Unfortunately, the ortho carboranes have certain other shortcomings which have limited their use for certain applications. Among these shortcomings is the tendency of the ortho carboranes to cyclize rather than polymerize in certain situations, and their susceptability to degradation under the attack of very strong alkali. For instance, the lower bis(hydroxy lower-alkyl)carboranes having from a total of 1 to 4 carbon atoms in the alkyl group will cyclize to exocycles when condensed with $H_3PO_4$ or formaldehyde, at elevated temperatures, rather than polymerize. In addition, polymeric products containing the ortho carborane group degrade in the presence of strong alkali. Since some of the potential applications for the ortho carborane derivatives would be as polymeric sealants and adhesives, the ortho isomers would not be advantageous for these uses. Thus, there is a need for carborane type materials which would combine the usual good thermal stability of the carboranes with superior resistance to strong alkali attack. Further, these materials would readily form thermally stable polymers when condensed with the appropriate reagents.

Surprisingly enough, it has been found that the recently discovered meta- and paraisomers of carborane have overcome the disadvantages of the ortho carboranes. For instance, under condensation conditions wherein ortho carboranes cyclize, the meta- and paracarboranes readily form valuable linear polymers. This, of course, extends the applications for which carboranes can be utilized. Further, when polymers containing the para- and metacarborane group are exposed to strong alkali attack, they are much more resistant than are polymers containing the ortho carborane isomer. In addition, the meta- and paracarboranes are significantly more stable to high temperatures than are the ortho carboranes.

Until recently it was not known that there would be any substantial difference in chemical properties between the various positional isomers of carborane. Thus, the tendency to cyclize the susceptibility to attack by alkali were considered inherent to all the carboranes. The superior properties of the meta and para isomers were discovered empirically and could not have been predicted. These chemical and physical properties are particularly advantageous when sealants, adhesives and the like containing the meta and para isomers are formulated in compositions which are to be exposed to mortar, cement, concrete bricks, etc., or any other alkaline environment.

A factor which has complicated the preparation of the para- and metacarborane derivatives and limited their use is the difficulty in preparing them. For example, whereas the ortho isomers are directly formed in the preparative reaction between acetylene (or substituted acetylenes) with decaboranes (or substituted decaboranes) in the presence of a Lewis base, the isomeric derivatives must be made indirectly. In fact, all presently known methods of preparing neocarboranes or paracarboranes must proceed through the preparation of ortho carborane or its derivatives. Since conversion of the ortho isomer to the other isomer requires a high temperature and pressure rearrangement, the process is tedious to run and frequently degrades unstable substituents. For these reasons, the preparation of new meta- and paracarborane derivatives represents an advance in the art.

Thus, it is an object of this invention, among others, to prepare new derivatives of meta- and paracarborane.

It is a further object to prepare new intermediates for the preparation of thermally stable, alkaline resistant polymers.

A further object is to prepare isomers of carborane which polymerize more readily than the corresponding ortho derivatives.

Other objects will become apparent after a further reading of this application.

The mono and dihalogenated meta- and paracarboranes of this invention can be prepared by several different processes. The method chosen depends largely upon the reactants that are available, the yield sought, and whether equipment is available for running high pressure reactions.

In the preferred process, a meta- or paracarboranyl alcohol or diol such as the hydroxy-loweralkylneocarborane, the bis(hydroxy-loweralkyl)neocarborane, the monohydroxyalkylneocarboranyl ethers, the bis (hydroxyalkyl)neocarboranyl ethers and the like or the corresponding paracarborane reactant is contacted with a reagent used to replace hydroxyl groups with halogens. The usual reaction conditions of elevated temperatures, inert solvents with or without optional catalysts are used. Favored reagents are $PBr_3$, $PBr_5$, $PCl_3$, $PCl_5$, concentrated HBr, concentrated HI, HCl gas and concentrated HCl solutions and the like or mixtures of these reagents. In addition, for certain situations, $SOCl_2$, $SOCl_2$ with pyridine, SOBr$_2$, BF$_3$, H$_2$SO$_4$—HCl, CaCl$_2$—HCl, ZnCl$_2$—HCl, KBr—H$_2$SO$_4$—HI, red phosphorus-bromine, red phosphorus-iodine and the like can be used.

The preparation of the products of this invention by the above process closely parallels that used in the art to prepare mono and dihalides from aliphatic alcohols and diols. The main difference being that the meta- and paracarborane alcohols and diols are even more thermally stable than their aliphatic analogues and thus much more vigorous reactant conditions can be used. In addition, the reactants having 0 to 3 carbon atoms separating the hydroxyl group(s) from the carboranyl group are more recalcitrant to replacement than their aliphatic analogues.

The following discussion summarizes the reactant conditions of the preferred process:

Temperature.—Reaction temperatures of up to 250° C., and in some instances higher can be used. A convenient means of maintaining favorable reaction temperature is to utilize an inert solvent which boils between 50–150° C. and refluxing at this range.

Pressure.—Ordinarily, atmospheric pressures are utilized although superatmospheric pressures can be used if desired.

Ratio of reactants.—Ordinarily, a two to threefold excess of the halogenating reactant over that required by stoichiometry is preferred. No apparent problem arises in using a greater excess of halogenating reagent although less than stoichiometric quantities of halogenating agent appears to diminish yields and extend reaction time.

Reaction time.—Ordinarily, reaction times vary from about 4 to 72 hours when the reaction is conducted at the reflux temperature of an inert solvent. However, in some instances, the rection time can extend to 200 hours or more where more recalcitrant reactants are utilized. Apparently, longer reaction times are not harmful.

Catalysts.—As indicated earlier, in some instances the use of esterification type catalysts and halogenation catalysts can be used. This is particularly the case when the gaseous hydrogen halides or their concentrated acids or mixtures of hydrogen halides and other reagents are used as reactants. These catalysts are well known in the art and include dehydration type catalysts such as concentrated sulfuric acid, anhydrous halides such as calcium and zinc chloride, potassium bromide as well as anhydrous BF$_3$, mixtures of red and yellow phosphorus and elemental bromine and iodine and the like.

In those situations where water is a by-product, the use of a trap to accumulate the water produced often expedites the reaction. A Dean-Stark trap is often valuable for this purpose.

Among the many neocarborane alcohols and diols and para carborane alcohols and diols which can be used as reactants are included the favored mono and bis(hydroxyalkyl) neocarboranes wherein the alkyl groups have from 1 to 8 carbon atoms. These include hydroxymethylneocarborane,
hydroxymethylparacarborane,
1,2-bis(hydroxymethyl)paracarborane,
hydroxyethylneocarborane,
hydroxyethylparacarborane,
1,2-bis(hydroxyethyl)neocarborane,
1,2-bis(hydroxyethyl)paracarborane,
hydroxypropylneocarborane,
hydroxypropylparacarborane,
1,2-bis(hydroxypropyl)neocarborane,
1,2-bis(hydroxypropyl)paracarborane,
the hydroxybutylneocarboranes,
the hydroxybutylparacarboranes,
the 1,2-bis(hydroxybutyl)neocarboranes,
the 1,2-bis(hydroxybutyl)paracarboranes and the like.

Other carborane alcohols and diols which can be used as reactants include bifunctional compositions such as the mono and dihydroxyalkylneo- and para carborane ethers. These ethers include, among others, the bis(2-hydroxymethyl-1-neocarboranylmethyl) ether,
the bis(2-hydroxymethyl-1-paracarboranylmethyl) ether,
the bis(2-hydroxyethyl-1-neocarboranylethyl) ether,
the bis(2-hydroxy-ethyl-1-paracarboranylethyl) ether and the like.

Again, the favored hydroxyalkyl ethers are those wherein the alkyl group has from 1 to 8 carbon atoms.

The 1-hydroxyalkylneocarboranes, the 1,2-bis(hydroxyalkyl) neocarboranes and the neocarboranyl "hydroxy" ethers of this invention, as well as their isomeric paracarboranyl counterparts can be prepared by starting with neocarborane or paracarborane and proceeding in an analogous manner to the methods described in preparing the corresponding ortho compounds. These are described in Inorg. Chem., vol. 2, Nov. 6, Dec. 2, 1963, pages 1087–1128.

For example, generally 1-hydroxy lower alkylneocarborane can be prepared by reacting a monolithio neocarborane (H—⊕—Li) with formaldehyde or ethylene oxide in the presence of inert solvent. A specific example of this is the preparation of 1-hydroxymethylneocarborane by the reaction of H—⊕—Li with CH$_2$O in the presence of benzene. The C,C'-bis(hydroxy-lower-alkyl)neocarboranes are prepared by analogous reactions reacting at least 2 moles of the formaldehyde or ethylene oxide reactants with dilithio neocarborane (Li—⊕—Li) in the presence of inert solvent. The corresponding paracarboranes are made by the same route, substituting the monolithio paracarborane or dilithio paracarborane (Li—⊕—H or Li—⊕—Li)

for the carborane or neocarborane derivative.

The 1-hydroxy-higher-alkylneocarboranes and C,C'-bis(hydroxy-higher-alkyl)neocarboranes, as well as the corresponding paracarboranes, are similarly prepared starting with the dilithio derivatives, but by reaction with compounds that contain functional groups that may be subsequently connected to the alcohol. For example, C,C'-bis(hydroxybutyl)neocarborane may be prepared by allowing dilithioneocarborane to react with an excess of 1,4-dichlorobutane and hydrolyzing the resulting C,C'-bis(chlorobutyl)carborane to the desired diol.

To better illustrate the inventive concept in both its composition and process aspects, the following examples illustrating a preferred embodiment of this invention is submitted.

In a suitable reaction vessel having heating, cooling and stirring means, are added 0.3 mole of 1,2-bis(hydroxyethyl)neocarborane, 0.8 mole of PCl$_3$ and 150 ml. of toluene. The reaction mixture is stirred and heated to reflux for 10 hours. At the end of this time, the reaction is halted, treated with water and the toluene layer separated and dried. The toluene is stripped off and the residue fractionated to give the dichloro product, Cl(CH$_2$)$_2$⊕(CH$_2$)$_2$Cl Analysis confirms the identity of the product.

In another embodiment, 1,2-bis(hydroxybutyl)neocarborane is allowed to react with excess PBr$_3$ to yield the dibromo product. The preparation is performed as follows:

In a reaction vessel similar to the one described above, is added 0.3 mole of 1,2-bis(hydroxybutyl)neocarborane and 1.0 mole of PBr$_3$ and 200 ml. of n-hexane. The stirred reaction mixture is heated to reflux for 16–20 hours to complete the reaction. At the end of this time, the reaction is halted and the reaction mixture cooled to room temperature and treated with water to give an organic layer and a water layer. The organic layer is dried over magnesium sulfate and the hexane stripped off. The residue is fractionated under vacuum to give a product which analysis confirmed to be Br(CH$_2$)$_4$⊕(CH$_2$)$_4$Br.

The following embodiments are illustrative of the preparation of monohalides from 1-monohydroxyalkylneocarboranes.

To a suitable reaction vessel are added with stirring, 0.3 mole of 1-hydroxyethyl carborane, 0.8 mole of PBr$_3$ and n-hexane. The reaction mixture is heated to reflux for 10 hours then halted. The cooled reaction mixture is diluted with an equal volume of water and the two layers separated. The hexane layer is dried and filtered and the hexane removed. The residue is fractionated under vacuum, dried and refractionated to give a final product. Analytical data establishes that the desired Br(CH$_2$)$_2$⊕H has been formed.

In a related embodiment 10 parts by weight of 1-hydroxyhexylneocarborane is mixed with 50 parts by weight of 48% HBr and 7 parts by weight of 98% H$_2$SO$_4$ in 150 ml. of n-heptane to form a reaction mixture. The reaction mixture is refluxed for 24 hours in a reaction vessel fitted with a Dean-Stark trap. At the end of this time, the reaction is halted and cooled down and diluted with twice the volume of water. The organic layer is separated, treated with magnesium sulfate, filtered and fractionated to produce the product, Br(CH$_2$)$_6$⊕H.

The comparable halogen paracarborane derivative is prepared by refluxing for 24 hours, a reaction mixture of 0.20 mole of 1-hydroxyhexylparacarborane, 0.75 mole of PBr$_3$ and 200 ml. of toluene. At the end of this time, the reaction mixture is worked up as before, and a purified product produced by fractional distillation.

The dibromo derivative of 1,2-bis(hydroxybutyl)paracarborane is prepared in a similar fashion by mixing 0.15 mole of 1,2-bis(hydroxybutyl)paracarborane, 0.75 mole of PBr$_3$ and 300 ml. of xylene. The reaction mixture is refluxed for 36 hours, cooled, diluted with twice the volume of water. At this time, the organic layer is separated, dried over magnesium sulfate and the xylene stripped off. The residuum is fractionated to give a product having the formula:

In a still further embodiment, the monohalide of 1-(hydroxyoctyl)neocarborane is prepared by reacting a 0.12 mole portion of 1-hydroxyoctylcarborane with .50 mole of a PCl$_3$ (0.35 mole)—PCl$_5$—(0.15 mole) mixture in 250 ml. of xylene. The reaction mixture is heated to reflux for 18 hours and isolated and purified as before. Analysis establishes the expected, Cl(CH$_2$)$_8$⊕H has been formed.

In another embodiment 1,2 - bis(hydroxybutyl)carborane is reacted with an excess of hydriodic acid to form the diiodo product. The preparation is performed as follows:

To a suitable reaction vessel containing a Dean-Stark trap is added 0.3 mole of 1,2-bis(hydroxybutyl)neocarborane and 2.0 moles of constant boiling hydriodic acid (57%) and 200 ml. of xylene. The stirred reaction mixture is heated to reflux for 32 hours to complete the reaction and drive off the water by-product. At the end of this time, the reaction is halted and the reaction mixture cooled to room temperature and diluted with water. The organic layer is separated, dried over magnesium sulfate and the xylene stripped off. Fractionating the residue under vacuum, produces a product which analysis establishes is the desired I(CH$_2$)$_4$⊕(CH$_2$)$_4$I.

To a vessel fitted with a Dean-Stark trap is added 1-hydroxybutylneocarborane (10 parts by weight) and a mixture of 255 parts by weight of concentrated hydrochloric acid and 8 parts by weight of anhydrous CaCl$_2$. A 50 parts by weight portion of toluene is added and the reaction mixture is heated to reflux for 24 hours. At the end of this time, the reaction mixture is cooled, diluted with an equal volume of water and the toluene layer separated and dried over magnesium sulfate. The dried toluene layer is filtered and the toluene stripped off to a residue. The residue is fractionated under high vacuum to give the product, Cl(CH$_2$)$_4$⊕H.

Another process for preparing the halogenated meta and para isomers of carborane makes use of a thermal rearrangement process. In this process an ortho θ carboranyl halide of the formula:

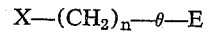

wherein X is a halogen, $n$ is an integer including 0, preferably 1–6, and E is selected from the group consisting of hydrogen and X—(CH$_2$)$_n$—, is heated between about 350–600° C. in a pressurized system such as an autoclave with or without catalysts, for a period of 12–72 hours or more until isomerization to the meta isomer takes place, i.e., X—(CH$_2$)$_n$—⊕—E is obtained by heating the ortho isomer in the same pressurized system to temperatures ranging from about 500 to 650° C. for an additional 24–72 hours.

To indicate the working of the inventive process, the following illustrative embodiments are submitted:

In one illustrative embodiment, ClCH$_2$⊕H is prepared by the pyrolysis of ClCH$_2$θH in a closed system.

A. Preparation of ClCH$_2$θH, chloromethylcarborane

A one-liter, three-necked flask, equipped with a stirrer and reflux condenser is charged with 25 g. of bis(acetonitrile) decaborane, 500 ml. of benzene and 14.1 g. of ClCH$_2$C≡CH. The mixture is agitated and brought to reflux and maintained at temperatures for 12 hours. The mixture is allowed to cool, filtered and the filtrate stripped off to remove solvent. An oily residue remains, which is extracted with petroleum ether. The petroleum ether extract is stripped off and the residue purified by vacuum distillation to yield ClCH$_2$θH.

B. Conversion of ClCH$_2$θH to ClCH$_2$⊕H

A 50 parts by weight portion of chloromethylcarborane prepared above is sealed into an autoclave equipped with a means of heating, cooling, and a pressure release valve. The autoclave is heated to about 400–550° C. for 30 hours. At the end of this time, the heating is discontinued and the autoclave is vented off and the gases condensed. Analytical data indicated that the above described product was obtained.

In a further embodiment of the inventive process, Cl⊕Cl is prepared from ClθCl as follows:

A. Preparation of ClθCl

A one-liter, three-necked flask, equipped with a stirrer and reflux condenser is charged with 0.25 g. of bis(acetonitrile) decaborane, 550 ml. of benzene and 0.15 g. of dichloroacetylene (ClC≡CCl). The mixture is agitated and brought to reflux and maintained at temperature for 14 hours. The mixture is allowed to cool, filtered and the filtrate stripped of excess solvent. An oily residue remained, which is extracted with petroleum ether. The petroleum ether extract is stripped off and the residue purified by distillation to yield ClθCl.

(B) Conversion of ClθCl to Cl⊕Cl

A 50 parts by weight portion of ClθCl prepared above is sealed into an autoclave equipped as described in the previous embodiment. The autoclave is heated to about 400–525° C. for 30 hours. At the end of this time, the heating is discontinued and the autoclave is vented off and the gases condensed. Analytical evidence confirms the presence of the desired product in the residue.

In another related embodiment, BrCH$_2$θCH$_2$Br is converted to the corresponding neocarborane as described below:

A. Preparation of BrCH$_2$θCH$_2$Br

A two-liter autoclave, equipped with heating, cooling and stirring means is charged with 35 g. of bis(acetonitrile)decaborane, 500 ml. of benzene and 17.2 g. of 1,4-dibromobutyne. The mixture is agitated and brought to reflux and maintained at the reflux temperature for 14 hours. The mixture is allowed to cool, filtered and the filtrate stripped off to remove solvent. The oily residue which remains is extracted twice with petroleum ether. The petroleum ether in the combined extracts is stripped off and the residue purified by distillation.

B. Conversion of BrCH$_2\theta$CH$_2$Br to BrCH$_2\oplus$CH$_2$Br

A 200 parts by weight portion of BrCH$_2\theta$CH$_2$Br prepared above is sealed into an autoclave equipped as previously described. The autoclave is heated to about 500° C. for 30 hours. At the end of this time, the heating is discontinued and the autoclave is vented off and the gases condensed. Analysis confirms that the desired 1,2-bis(bromomethyl)neocarborane is produced.

A third process for preparing the product of this invention is to react an alkali metal derivative, preferably the lithium derivative of a reactant having the formula:

$$M-(CH_2)_n-A-(CH_2)_{n'}M$$

wherein M is selected from the group consisting of hydrogen and alkali metals, A is the symbol representing the diradical of the meta and para isomers of carborane, $n$ and $n'$ are integers including 0, with the proviso that at least one of the M's be alkali at any given time, with a dihaloalkane of the formula:

$$X(CH_2)_nX$$

wherein $n$ has the same meaning given above, and X is halogen, preferably in the presence of an inert solvent, at temperatures ranging from about −10° C. to 150° C.

In the preferred practice, the mono or dihalogenated alkane, in excess, is added to an ether solution of the mono or dilithium-meta or para carborane and the reaction mixture is heated to reflux. The reaction solution is refluxed until the mono or dihalide is formed and one or two moles of lithium halide is precipitated. The reaction mixture is treated with water and the ether layer separated and dried over magnesium sulfate and filtered. The ether is removed and the residue is distilled under vacuum to yield the purified mono or dihalogenated carborane product.

The same procedure can be used to prepare the mono and dihalogenated ethers of the meta and para carboranes. In these instances, a reactant of this type:

$$(MA(CH_2)_n)_2O$$

wherein M is an alkali metal, preferably lithium, and A and $n$ are defined as above, is contacted with the aforementioned mono or dihalogenated alkanes, under the same conditions described above until the product is obtained.

The flexibility of reaction conditions in the above process is manifested in several respects. For instance while the reaction is preferably run using inert solvents such as the dialkylethers, tetrahydrofuran, hexane, aromatics, etc., since the reactants are used in the form of their reaction mixture, no additional solvents need be added.

Other permissible process variations are as follows:

Reactants.—The lithium derivatives of the meta- and paracarboranes (or their ethers) are favored reactants because of their good reactivity and their ease of preparation. However, the other metallic derivatives including the various alkaline earth and the alkali metal derivatives may be used. These include the corresponding sodium and potassium ether derivatives as well as Grignard reagents.

Temperatures.—Preferably the reaction is run at temperatures ranging from about 25–100° C. This range is preferred because the reaction goes smoothly at these temperatures and can be readily handled. However, higher temperatures can be used (100° C. or higher) where the individual reactant has the necessary stability.

Pressure.—Ordinarily, near atmospheric pressures are used but super atmospheric pressures can be used if desired.

Reaction time.—The reaction is ordinarily complete within ¼ to 24 hours after the addition of the two reactants. However, since the reaction time is dependent upon variables such as the carborane reactant and the temperature and/or pressure employed, greater or lesser times are possible.

Ratio of reactants.—Preferably, near stoichiometric ratios of the two reactants are preferred. However, this ratio can be reduced or exceeded by as much as 25% or more without effecting operability.

The preparation of the lithium derivatives of carborane ethers and the chemistry of these ethers is described in Inorg. Chem., vol. 2, 1125 (December 1963) by Grafstein, et al.

The corresponding dilithium derivatives of neocarborane reactants such as ether derivative, (Li$\oplus$CH$_2$)$_2$O, can be prepared by reacting an alkyl lithium with the composition (Li$\oplus$CH$_2$)$_2$O. The other alkali derivatives are formed in the same way except that alkyl sodium or potassium are used instead of the alkyl lithium. An illustrative preparation follows:

In a suitable reaction vessel equipped with heating, cooling, stirring and distillation means are placed .099 mole of butyl lithium in 150 ml. of diethyl ether. To the stirred and chilled solution is slowly added 0.045 mole of bis(1-neocarboranylmethyl) ether dissolved in 300 ml. of diethyl ether. The reaction mixture is allowed to rise to about 35° C. and is stirred for about 3.5 hours. The dilithium reactant thus formed is used in the form of the reaction mixture.

The following embodiments are illustrative of the inventive reaction. To an aliquot containing 0.0150 mole of the above described dilithiated reactant in ether is added 0.305 mole of 1,4-dibromobutane. After the addition is complete, the reaction mixture is stirred and refluxed for 3 hours. The reaction mixture is treated with water and the ether layer which forms is separated. The ether layer is dried, filtered and distilled under vacuum to give a product which analysis indicated to be:

$$(BR\oplus CH_2)_2O$$

In another embodiment, the monochloroneocarborane, Cl(CH$_2$)$_3\oplus$H is prepared by reacting the neocarborane derivative, Li$\oplus$H with ClCH$_2$CH$_2$CH$_2$Cl as follows:

In a reaction vessel equipped with heating, cooling, stirring and distillation, are placed 0.10 mole of Li$\oplus$H in diethyl ether, and 0.15 mole of ClCH$_2$CH$_2$CH$_2$Cl in diethyl ether. The reaction mixture is refluxed for 3 hours and cooled to room temperature. The cooled reaction mixture is treated with water and the ether layer containing product is separated, dried over magnesium sulfate and filtered off. The ether is stripped off and the residue distilled under vacuum to give the above identified product.

In a further embodiment, the dibromoneocarborane, Br(CH$_2$)$_2\oplus$(CH$_2$)$_2$Br, is formed by refluxing 0.10 mole of Li$\oplus$Li with 0.30 mole of Br(CH$_2$)$_2$Br in the presence of excess ether for 10 hours. The reaction mixture is treated with water, separated, dried, stripped and distilled as described above to give the described product.

The reactants for the above process are prepared by either of two alternative processes disclosed in the commonly owned, copending application of Grafstein et al., filed in the United States Patent Office on Mar. 20, 1961, and designated as S.N. 97,098, now Patent Number 3,226,429.

In one process, a mono or dihalogenated acetylene is contacted with a decaborane or an alkyl decaborane in the presence of a Lewis base until a mole of hydrogen is evolved and the product is formed. Isolation and purification procedures are comparable to those used in synthetic organic chemistry such as solvent extraction, chromatography, distillation and recrystallation. For example, one procedure is to strip off any residual solvent left in the reaction mixture, then concentrating to dryness and taking up the residue in a solvent such as cyclohexane, tetrahydrofuran, benzene, etc. The solvent solution can be decolorized with activated carbon, filtered and stripped down to a product which can be further purified by recrystallization where the product is a liquid fractional distillation of chromatography and can be used to purify the product further.

In the alternative process, the acetylenic halide is contacted with the reaction product of a Lewis base with decaborane or alkyl decaborane, ordinarily in the presence of an aromatic solvent such as benzene, toluene or xylene and the like. A favored decaborane derivative is 6,9-bis(acetonitrile)decaborane. The reaction conditions such as temperatures, pressures, solvents and the like are the same in both processes. In effect, the first process, the Lewis base decaborane (or alkyl decaborane) complex, is formed in situ which, in the second process, it is formed outside the reaction vessel. Because of its time saving aspects, the in situ process is preferred.

As the numerous illustrative embodiment indicate, this invention can be varied and modified without departing from the inventive concept. However, the metes and bounds of the invention are best shown by the claims which follow.

We claim:

1. Carbon attached mono and dihalogen substituted carboranes selected from the group consisting of metacarborane and paracarborane.

2. Halogenated carboranes selected from the group consisting of:

$$X-(CH_2)_n-A-(CH_2)_{n'}-X'$$

and $$X-A-(CH_2)_nO(CH_2)_{n'}A-X'$$

wherein at least one of X and X' is a halogen atom and the other is selected from the group consisting of halogen and hydrogen, $n$ and $n'$ are integers including 0, and A is the symbol for isomers of the carborane diradical as selected from the group consisting of neocarborane and paracarborane radicals.

3. Halogenated carborane of the formula:

$$X-(CH_2)_n-A-(CH_2)_{n'}-X'$$

wherein at least one of X and X' is a halogen atom and the other is selected from the group consisting of halogen and hydrogen, $n$ and $n'$ are integers, including 0, and A is the symbol for isomers of the carborane diradicals selected from the group consisting of neocarborane and paracarborane.

4. Halogenated carboranes of the formula:

$$X-(CH_2)_n-\oplus-(CH_2)_{n'}-X'$$

wherein at least one of X and X' is a halogen atom and the other is selected from the group consisting of halogen and hydrogen, $n$ and $n'$ are integers, including 0, and $\oplus$ is the symbol for the meta isomer of the carborane diradical.

5. Dihalogenated carboranes of the formula:

$$X-(CH_2)_n-\oplus-(CH_2)_{n'}-X$$

wherein X is halogen, $n$ and $n'$ are integers ranging from 1 up to and including 4, and $\oplus$ is the symbol for the meta isomer of the carborane diradical.

6. Halogenated carborane of the formula:

$$X-(CH_2)_n-\oplus-(CH_2)_{n'}-X$$

wherein at least one of X and X' is a halogen atom and the other is selected from the group consisting of halogen and hydrogen, $n$ and $n'$ are integers, including 0, and $\oplus$ is the symbol for the para isomer of the carborane diradical.

7. The dihalogenated carboranes of claim 5 wherein halogen is chlorine.

8. The dihalogenated carboranes of claim 5 wherein halogen is bromine.

9. $Cl(CH_2)_2\oplus(CH_2)_2Cl$, wherein $\oplus$ is the symbol for the meta isomer of the carborane diradical.

10. $Br(CH_2)_2\oplus(CH_2)_2Br$, wherein $\oplus$ is the symbol for the meta isomer of the carborane diradical.

11. $ClCH_2\oplus CH_2Cl$, wherein $\oplus$ is the symbol for the meta isomer of the carborane diradical.

12. $BrCH_2\oplus CH_2Br$, wherein $\oplus$ is the symbol for the meta isomer of the carborane diradical.

13. $Cl(CH_2)_3\oplus(CH_2)_3Cl$, wherein $\oplus$ is the symbol for the meta isomer of the carborane diradical.

14. $Br(CH_2)_3\oplus(CH_2)_3Br$, wherein $\oplus$ is the symbol for the meta isomer of the carborane diradical.

15. $Cl(CH_2)_4\oplus(CH_2)_4Cl$, wherein $\oplus$ is the symbol for the meta isomer of the carborane diradical.

16. $Br(CH_2)_4\oplus(CH_2)_4Br$, wherein $\oplus$ is the symbol for the meta isomer of the carborane diradical.

17. $I(CH_2)_4\oplus(CH_2)_4I$, wherein $\oplus$ is the symbol for the meta isomer of the carborane diradical.

18. $ClCH_2\oplus H$, wherein $\oplus$ is the symbol for the meta isomer of the carborane diradical.

19. $BrCH_2\oplus H$, wherein $\oplus$ is the symbol for the meta isomer of the carborane diradical.

20. $Cl\oplus H$, wherein $\oplus$ is the symbol for the meta isomer of the carborane diradical.

21. $Br(CH_2)_2\oplus H$, wherein $\oplus$ is the symbol for the meta isomer of the carborane diradical.

22. $Cl\oplus Cl$, wherein $\oplus$ is the symbol for the meta isomer of the carborane diradical.

23. $Cl(CH_2)_3\oplus H$, wherein $\oplus$ is the symbol for the meta isomer of the carborane diradical.

24. $Cl(CH_2)_3\oplus H$, wherein $\oplus$ is the symbol for the meta isomer of the carborane diradical.

25. $(Br\oplus CH_2)_2O$, wherein $\oplus$ is the symbol for the meta isomer of the carborane diradical.

26. $[Br\oplus(CH_2)_2]_2O$ wherein $\oplus$ is the symbol for the meta isomer of the carborane diradical.

27. $[Br\oplus(CH_2)_3]_2O$ wherein $\oplus$ is the symbol for the meta isomer of the carborane diradical.

28. A process for preparing neocarborane halides selected from the group consisting of:

$$X-(CH_2)_n-\oplus-(CH_2)_{n'}-X'$$

and $$X-\oplus(CH_2)_nO(CH_2)_{n'}\oplus-X'$$

wherein at least one of X and X' is a halogen atom and the other is selected from the group consisting of halogen and hydrogen, $n$ and $n'$ are integers, including 0, and $\oplus$ is the symbol for the meta isomer of the carborane diradical, comprising heating a carboranyl halide selected from the group consisting of:

$$X-(CH_2)_n-\theta-(CH_2)_{n'}-X$$

and $$X-\theta-(CH_2)_nO(CH_2)_{n'}\theta-X'$$

wherein X, X', $n$ and $n'$ are as defined above and $\theta$ is the symbol for the ortho isomer of the carborane diradical, to a temperature of about 400°–600° C. at superatmospheric pressures, until said carboranyl halide is formed and isolating the neocarborane halides contained therein.

29. A process for preparing neocarborane halides selected from the group consisting of:

$$X-(CH_2)_n-\oplus-(CH_2)_{n'}-X'$$

and $$X-\oplus(CH_2)_nO(CH_2)_{n'}\oplus-X'$$

wherein at least one of X and X' is a halogen atom and the other is selected from the group consisting of halogen and hydrogen, $n$ and $n'$ are integers, including 0, and $\oplus$ is the symbol for the meta isomer of the carborane diradical, comprising contacting an alkali metal derivative of a neocarborane reactant selected from the group consisting of:

$$M-(CH_2)_n-\oplus-(CH_2)_{n'}M$$

wherein M is selected from the group of hydrogen and alkali metals, $\oplus$ is the symbol for the meta isomer of the carborane diradical, $n$ and $n'$ are integers including 0, and at least one of the M's be alkali metal at any given time, with dihaloalkane of the formula:

$$X(CH_2)_nX$$

wherein $n$ is as defined above, and X is a halogen, in the presence of an inert solvent, until a neocarborane halide is formed, and isolating said neocarborane halide contained therein.

30. $[Br\oplus(CH_2)_4]_2O$ wherein $\oplus$ is the symbol for the meta isomer of the carborane diradical.

No references cited.

TOBIAS E. LEVOW, *Primary Examiner.*

W. F. W. BELLAMY, *Assistant Examiner.*

UNITED STATES PATENT OFFICE

CERTIFICATE OF CORRECTION

Patent No. 3,376,347  April 2, 1968

Marvin M. Fein et al.

It is certified that error appears in the above identified patent and that said Letters Patent are hereby corrected as shown below:

Column 5, line 66, "255" should read -- 25 --. Column 6, line 49, "550" should read -- 5 --.

Signed and sealed this 10th day of March 1970.

(SEAL)
Attest:

Edward M. Fletcher, Jr.

Attesting Officer

WILLIAM E. SCHUYLER, JR

Commissioner of Patents